(12) United States Patent
McJunkin et al.

(10) Patent No.: US 6,708,582 B1
(45) Date of Patent: Mar. 23, 2004

(54) BICYCLE RIDER HAND ATTACHMENT AND COOPERATING GEAR SHIFT ACTUATOR AND ASSOCIATED METHODS

(75) Inventors: Mark P. McJunkin, Macon, GA (US); Loronzo H. Thomson, Byron, GA (US); Brian H. Thomson, Warner Robins, GA (US)

(73) Assignee: L. H. Thomson Company, Inc., Macon, GA (US)

( * ) Notice: Subject to any disclaimer, the term of this patent is extended or adjusted under 35 U.S.C. 154(b) by 286 days.

(21) Appl. No.: 09/779,191

(22) Filed: Feb. 8, 2001

Related U.S. Application Data
(60) Provisional application No. 60/180,975, filed on Feb. 8, 2000.

(51) Int. Cl.[7] .................. B62K 21/26; A41D 19/00; F16C 1/10
(52) U.S. Cl. .............. 74/488; 74/489; 74/502.2; 74/551.9; 2/161.1; 2/161.4
(58) Field of Search ................ 74/489, 502.2, 74/551.1, 551.9; 2/161.4, 161.1; D29/113

(56) References Cited

U.S. PATENT DOCUMENTS

| | | | |
|---|---|---|---|
| 1,441,251 A | | 1/1923 | Steffens |
| 4,420,843 A | * | 12/1983 | Genzling et al. ............... 2/161 |
| 4,570,269 A | | 2/1986 | Berlese ...................... 2/161 A |
| 4,900,291 A | | 2/1990 | Patterson .................... 474/80 |
| 5,031,640 A | * | 7/1991 | Spitzer ...................... 128/878 |
| 5,110,154 A | | 5/1992 | Street ........................ 280/822 |
| 5,123,674 A | | 6/1992 | Bagneres et al. ........... 280/821 |
| 5,133,233 A | | 7/1992 | Erwin ........................ 81/3.57 |
| 5,177,467 A | * | 1/1993 | Chung-Piao ................ 340/574 |
| 5,197,927 A | | 3/1993 | Patterson et al. ............. 474/80 |
| 5,312,134 A | | 5/1994 | Goode et al. ............... 280/822 |
| 5,328,205 A | | 7/1994 | Bacharach ................. 280/822 |
| 5,353,440 A | | 10/1994 | Meldeau .................... 2/161.1 |
| 5,516,150 A | | 5/1996 | Goode et al. ............... 280/821 |
| 5,564,316 A | | 10/1996 | Larson et al. ............... 74/551.9 |
| 5,584,213 A | | 12/1996 | Larson et al. ............... 74/551.9 |
| 5,590,564 A | * | 1/1997 | Kishimoto .................... 74/475 |
| 5,611,735 A | | 3/1997 | Jackson ........................ 473/60 |

(List continued on next page.)

FOREIGN PATENT DOCUMENTS

| | | | | |
|---|---|---|---|---|
| DE | 29709323 U1 | * | 10/1997 | ............... 2/161 A |
| GB | 2335733 A | * | 9/1999 | ............... 74/551.1 |
| WO | WO 02/058493 A1 | * | 8/2002 | ............... 2/161 A |

OTHER PUBLICATIONS

Product Information on SRT 800 X–Ray.
Advertisment for Shimano, Trek 1997, p. 86.
Shimano MTB/ST–M952, SL–M952, BL–M950, downloaded from www.shimano.com, Nov. 1, 1999.
Shimano MTB/SL–MC41, SL–MC38, downloaded from www.shimano.com, Nov. 1, 1999.

*Primary Examiner*—Vinh T. Luong
(74) *Attorney, Agent, or Firm*—Allen, Dyer, Doppelt, Milbrath & Gilchrist, P.A.

(57) ABSTRACT

A bicycle gear shifting system includes a gear shifting derailleur, a rotatable shift member to be rotatably carried by handlebars of the bicycle and connected to the gear shifting derailleur, and a hand attachment to be carried by a hand of a rider. The rotatable shift member and the hand attachment may each have respective mating surfaces for positively engaging one another to facilitate gear shifting by the rider and are readily releasable to permit the rider to change hand positions. More particularly, the mating surfaces may include pairs of corresponding recesses and projections. The pairs of corresponding recesses and projections may also be tapered. Furthermore, the mating surfaces may engage in superposed relation upon radial squeezing of the hand of the rider. According to another embodiment, the mating surfaces may engage in side-by-side relation upon lateral positioning of the hand of the rider.

13 Claims, 15 Drawing Sheets

U.S. PATENT DOCUMENTS

| | | | |
|---|---|---|---|
| 5,815,839 A | | 10/1998 | Safford |
| 5,829,313 A | | 11/1998 | Shahana .................... 74/502.2 |
| 6,006,751 A | * | 12/1999 | Spitzer ....................... 128/878 |
| 6,199,447 B1 | * | 3/2001 | Lump et al. ............... 74/551.9 |
| D442,745 S | * | 5/2001 | Minkow et al. ........... D29/113 |
| 6,289,517 B1 | * | 9/2001 | Minkow et al. ............. 2/161.1 |
| 6,431,943 B1 | * | 8/2002 | Rehkemper et al. ........ 446/440 |

* cited by examiner

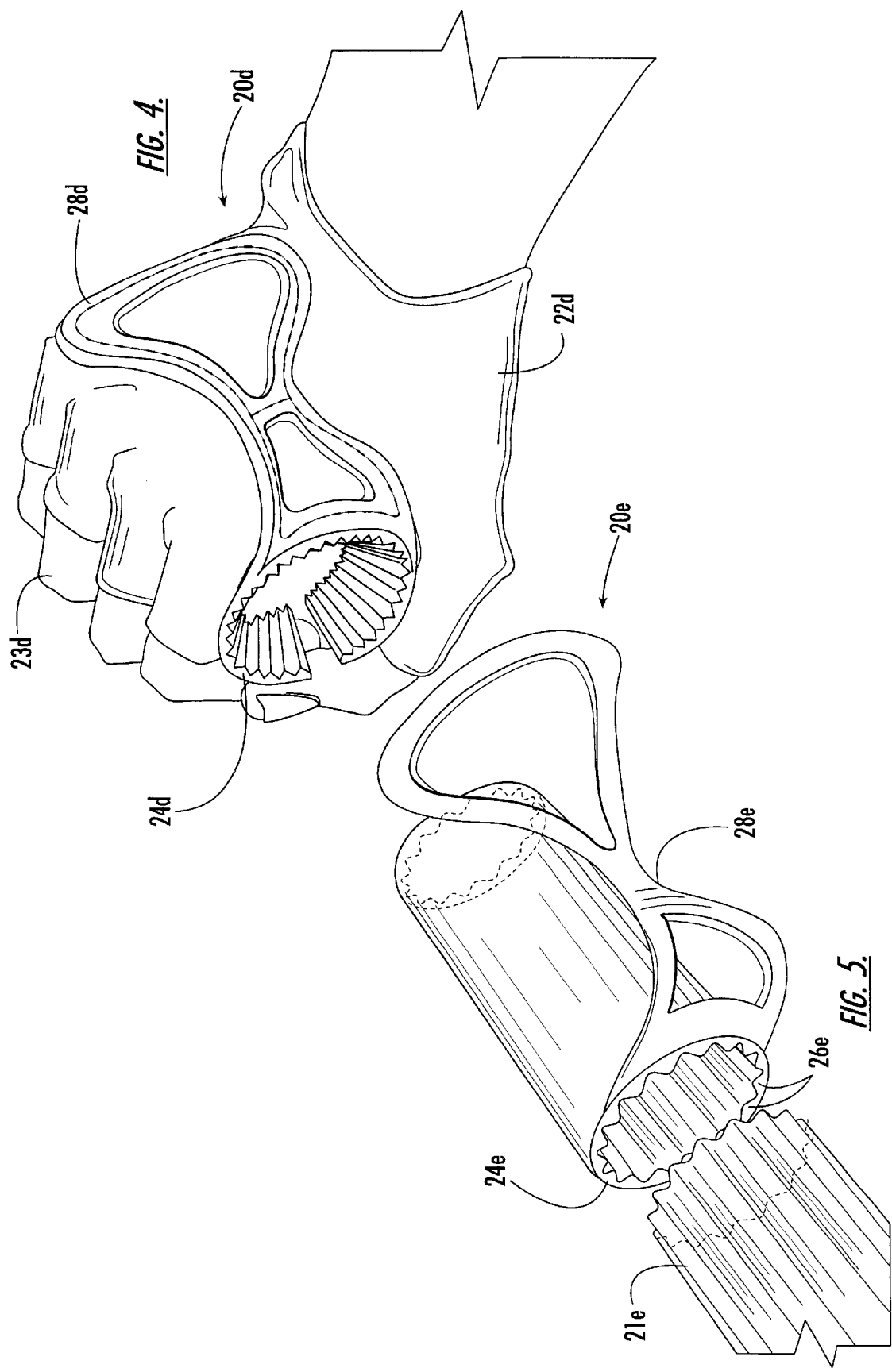

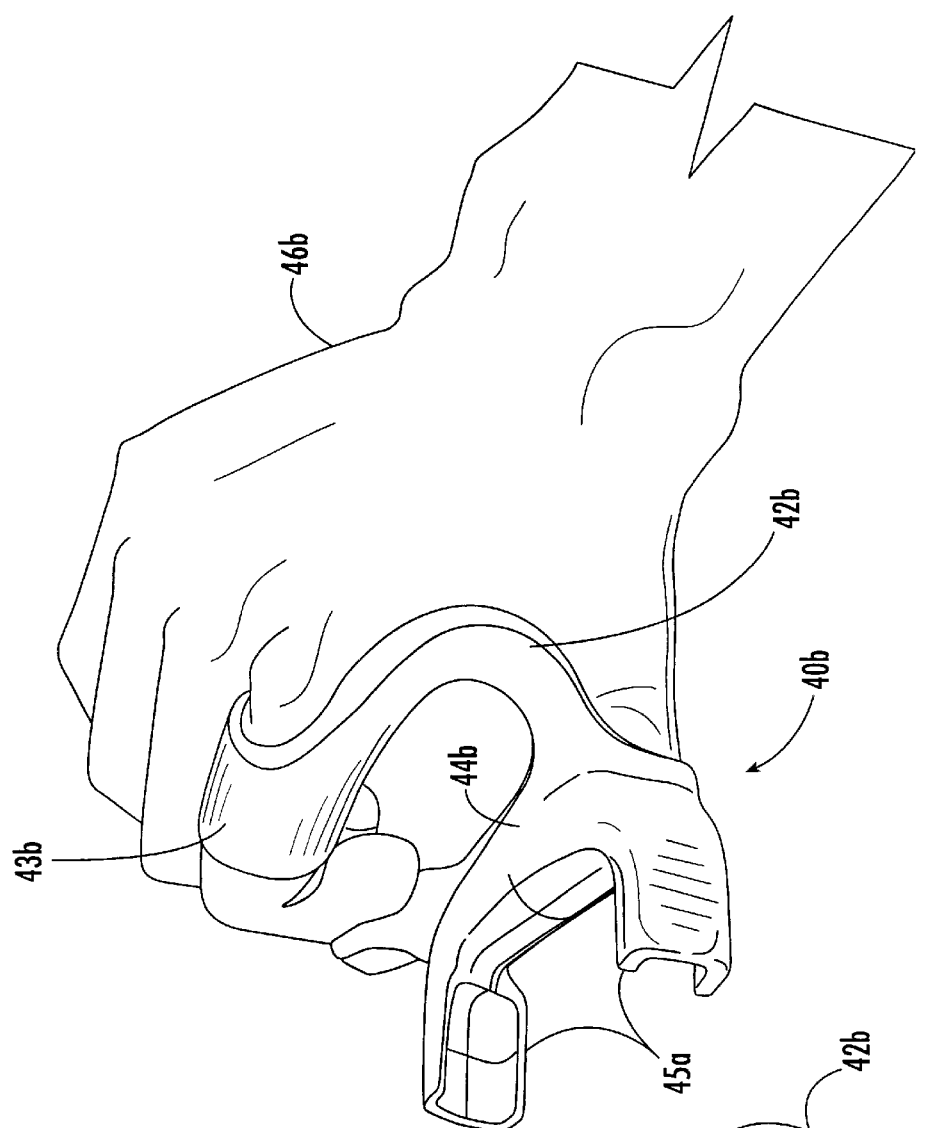
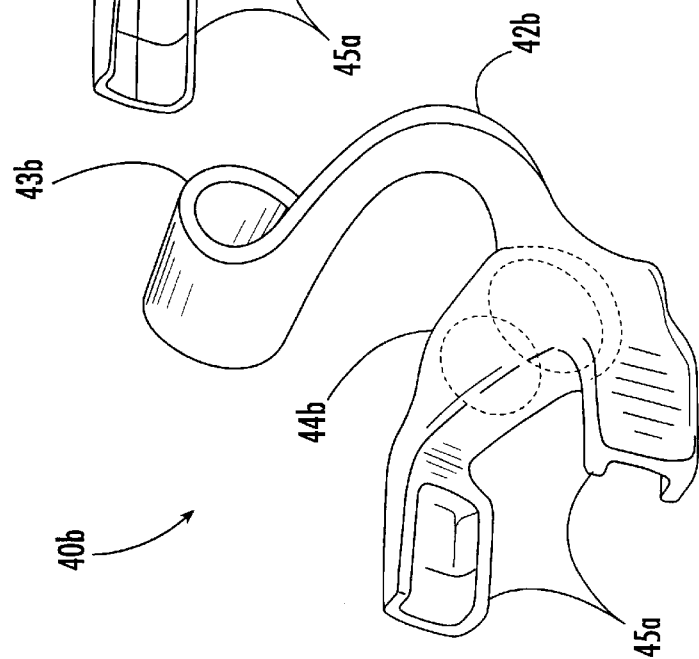

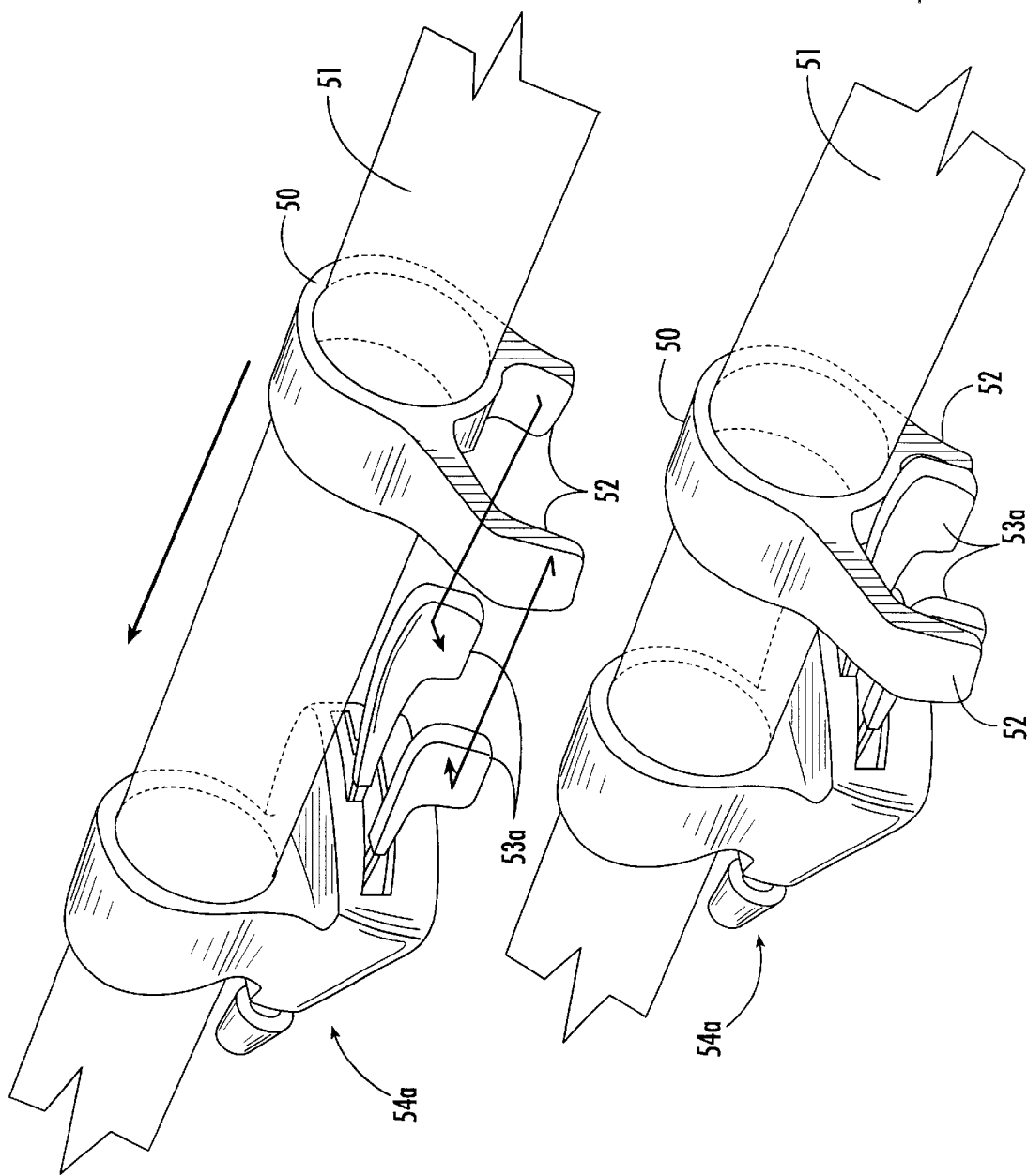

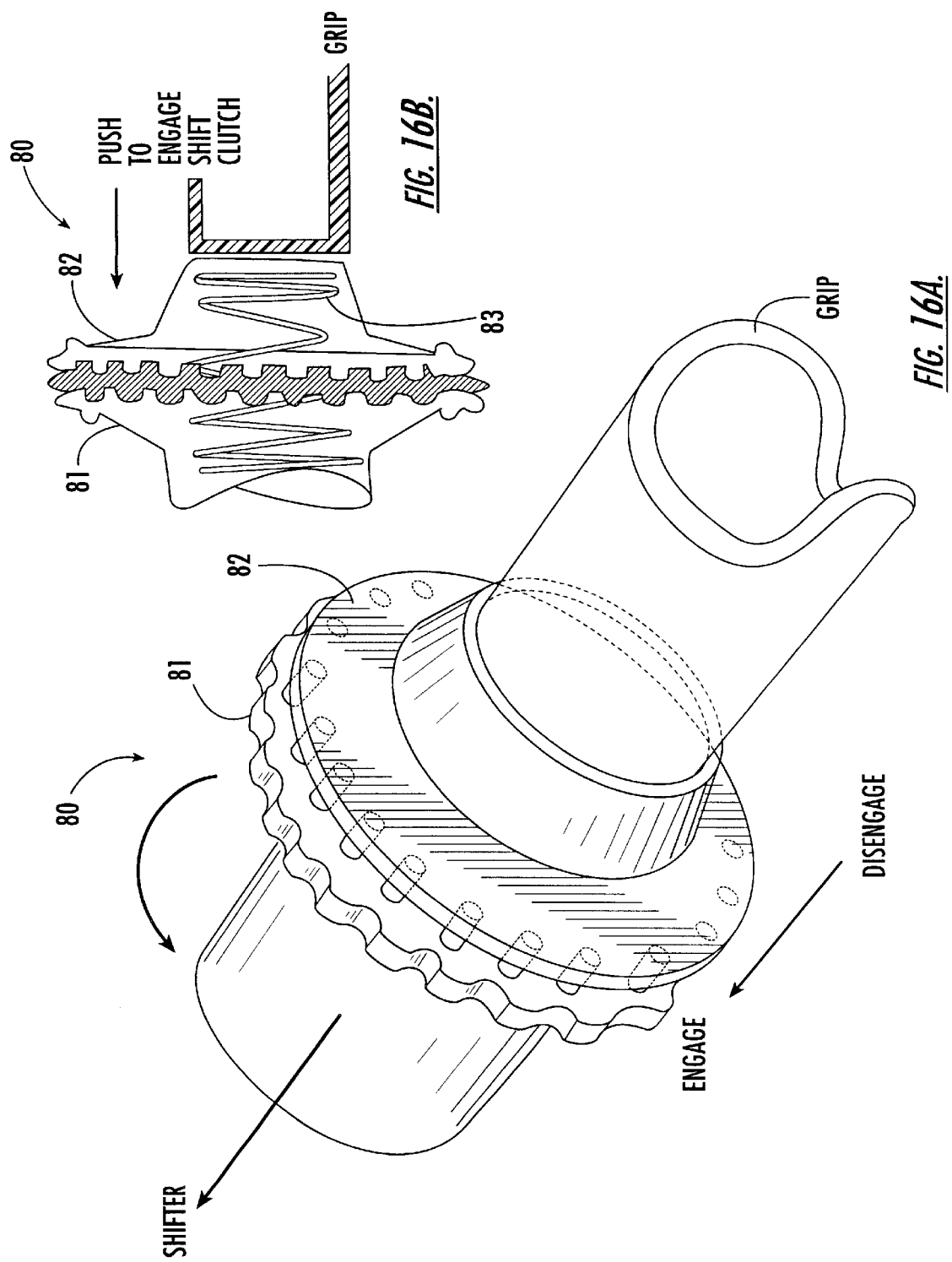

BICYCLE RIDER HAND ATTACHMENT AND COOPERATING GEAR SHIFT ACTUATOR AND ASSOCIATED METHODS

RELATED APPLICATION

The present application is based upon provisional application serial No. 60/180,975 filed Feb. 8, 2000, which is hereby incorporated herein in its entirety by reference.

FIELD OF THE INVENTION

The present invention is directed to the field of bicycles, and more particularly, to a glove or similar device or attachment for the hand of a bicycle rider which engages and cooperates with a gear shift actuator mounted on the handlebar of the bicycle.

BACKGROUND OF THE INVENTION

Mountain or off-road bikes are widely used for recreation and sport. A typical mountain bike includes front and rear chain derailleurs which move the chain among different sprockets to change gear ratios and thereby assist the rider in matching his power output to the load conditions. The front and rear derailleurs are typically controlled by respective cables which, in turn, are operated by shift actuators mounted on opposite ends of the handlebars. In other embodiments, the derailleurs may be controlled through hydraulic, pneumatic, or electronic operation rather than by cables.

One type of shift actuator is a twist type shifter, such as described, for example, in U.S. Pat. Nos. 5,564,316 and 5,584,213, both to Larson et al. In addition to the basic twist shifting arrangement, these patents also discuss the need for providing a readily and comfortably gripped surface for the bare hand of the rider. In particular, each patent discloses a resilient material tubular grip with axially extending alternating patterns of ribs and grooves. The ribs and grooves are spaced such that they desirably fit naturally into the crooks of the rider's thumb and finger or fingers and the portion of the palm therebetween.

The conventional twist grip shift actuators include a rotatable tubular portion that is grasped between the forefinger and thumb. Unfortunately, it may be difficult for the rider to retain a firm grip on the handlebar with the other three fingers of the hand while the forefinger and thumb grip and rotate the rotatable portion to shift gears. Typically, a rider must release his grip and slide his hand inward to grasp the rotatable portion to shift gears. It is often undesirable to release one's grip from the handlebars, particularly for mountain biking.

Another embodiment of a shifter according to the prior art is offered by Shimano, for example, under the designation Rapid Fire. This arrangement typically uses two pairs of paddles or levers, one pair for each derailleur. One paddle of the pair advances the gearing, while the other paddle reduces the gearing. The paddle must be contacted and pressed by the thumb or forefinger of the rider to change gears. Again, the rider's grip is released or at least weakened when shifting gears using the paddle type shift actuators.

SUMMARY OF THE INVENTION

In view of the foregoing background, it is therefore an object of the present invention to provide a device and associated method which permits the rider to maintain a secure grip on the handlebar, yet readily operate a twist type shift actuator.

It is another object of the present invention to provide a device and associated method which permits the rider to maintain a secure grip on the handlebar, yet readily operate a paddle type shift actuator.

These and other objects, features, and advantages in accordance with the present invention are provided by a bicycle gear shifting system including a rotatable shift member to be rotatably carried by handlebars of the bicycle and connected to the gear shifting derailleur, and a hand attachment to be carried by a hand of a rider, wherein the rotatable shift member and the hand attachment each have respective mating surfaces for positively engaging one another to facilitate gear shifting by the rider. In some embodiments, the mating surfaces may also provide ready releasability to permit the rider to change hand positions quickly.

More particularly, the mating surfaces may include pairs of corresponding recesses and projections. Each pair of corresponding recesses and projections may also be tapered to facilitate engagement and release in some embodiments. In one class of embodiments, the mating surfaces may engage in superposed relation upon radial squeezing of the hand of the rider. In another class of embodiments, the mating surfaces may engage in side-by-side relation based upon lateral positioning of the hand of the rider.

The hand attachment may include a gripping portion defining the mating surface. In some embodiments, the hand attachment may further include a flexible body portion for covering at least a portion of the hand of the rider and carrying the gripping portion. A reinforcing portion may be connected to the gripping portion and also carried by the flexible body portion. Additionally, the flexible body portion may include fabric, and the gripping portion may include plastic.

The hand attachment may further include at least one finger ring portion connected to the gripping portion. More specifically, the at least one finger ring portion may include a thumb ring portion and an index finger ring portion, and the gripping portion may extend between the thumb ring portion and the index finger ring portion.

The bicycle gear shifting system may further include a twist derailleur actuator carried by the handlebars, and the rotatable shift member may include portions for operating the twist derailleur actuator. Alternatively, the bicycle gear shifting system may include a paddle derailleur actuator carried by the handlebars, and the rotatable shift member may include a pair of paddle engaging portions for operating the paddle derailleur actuator.

A method aspect of the invention is for using a bicycle gear shifting system including a rotatable shift member rotatably carried by handlebars of the bicycle and connected to the gear shifting derailleur. The method may include placing a hand attachment on a hand of a rider, positively engaging respective mating surfaces on the rotatable shift member and the hand attachment, and rotating the rotatable shift member using the hand attachment to actuate the gear shifting derailleur. The respective mating surfaces may be readily releasable to permit the rider to change hand positions quickly.

A bicycle gear shifting system according to another embodiment of the present invention includes a paddle derailleur actuator carried by handlebars of the bicycle, and a hand attachment to be carried by a hand of a rider. The hand attachment may include a pair of paddle engaging portions for operating the paddle derailleur actuator.

Yet another method aspect of the invention is for using a bicycle gear shifting system comprising a paddle derailleur actuator carried by handlebars of the bicycle and connected to a gear shifting derailleur. The method may include placing a hand attachment including a pair of paddle engaging portions on a hand of a rider, engaging paddles of the paddle derailleur actuator with the pair of paddle engaging portions, and rotating the hand attachment to operate the paddles and actuate the gear shifting derailleur.

Yet another aspect of the invention relates to a bicycle gear shifting system comprising a gear shifting derailleur, a paddle derailleur actuator carried by handlebars of the bicycle, and a rotatable shift member to be rotatably carried by the handlebars of the bicycle and comprising a pair of paddle engaging portions for operating the paddle derailleur actuator. In other words, in accordance with this aspect, the invention may be considered as a converter for converting a paddle type actuator into a twist type actuator. The rotatable shift member may comprise plastic. In addition, the system may further comprise a hand attachment to be carried by a hand of a rider, and the rotatable shift member and hand attachment may each have respective mating surfaces for positively engaging one another.

The corresponding method aspect is directed to the method for converting a paddle derailleur actuator on handlebars of a bicycle into a twist derailleur actuator. The method may include rotatably positioning a rotatable shift member on handlebars of the bicycle and comprising a pair of paddle engaging portions for operating the paddle derailleur actuator.

BRIEF DESCRIPTION OF THE DRAWINGS

FIG. 4 is a perspective view of a fourth embodiment of a glove for a twist type shifter in accordance with the present invention.

FIG. 5 is a perspective view of a fifth embodiment of a hand attachment and portion of the shift actuator for a twist type shifter in accordance with the present invention.

FIGS. 11A and 11B are perspective views of an eleventh embodiment of a hand attachment for a paddle type shifter in accordance with the present invention.

FIGS. 12A and 12B are perspective views of a twelfth embodiment of a rotatable adapter for a paddle type shifter in accordance with the present invention.

FIGS. 16A and 16B are a perspective view and side cross-sectional view of a sixteenth embodiment of a shift actuator in accordance with the present invention.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
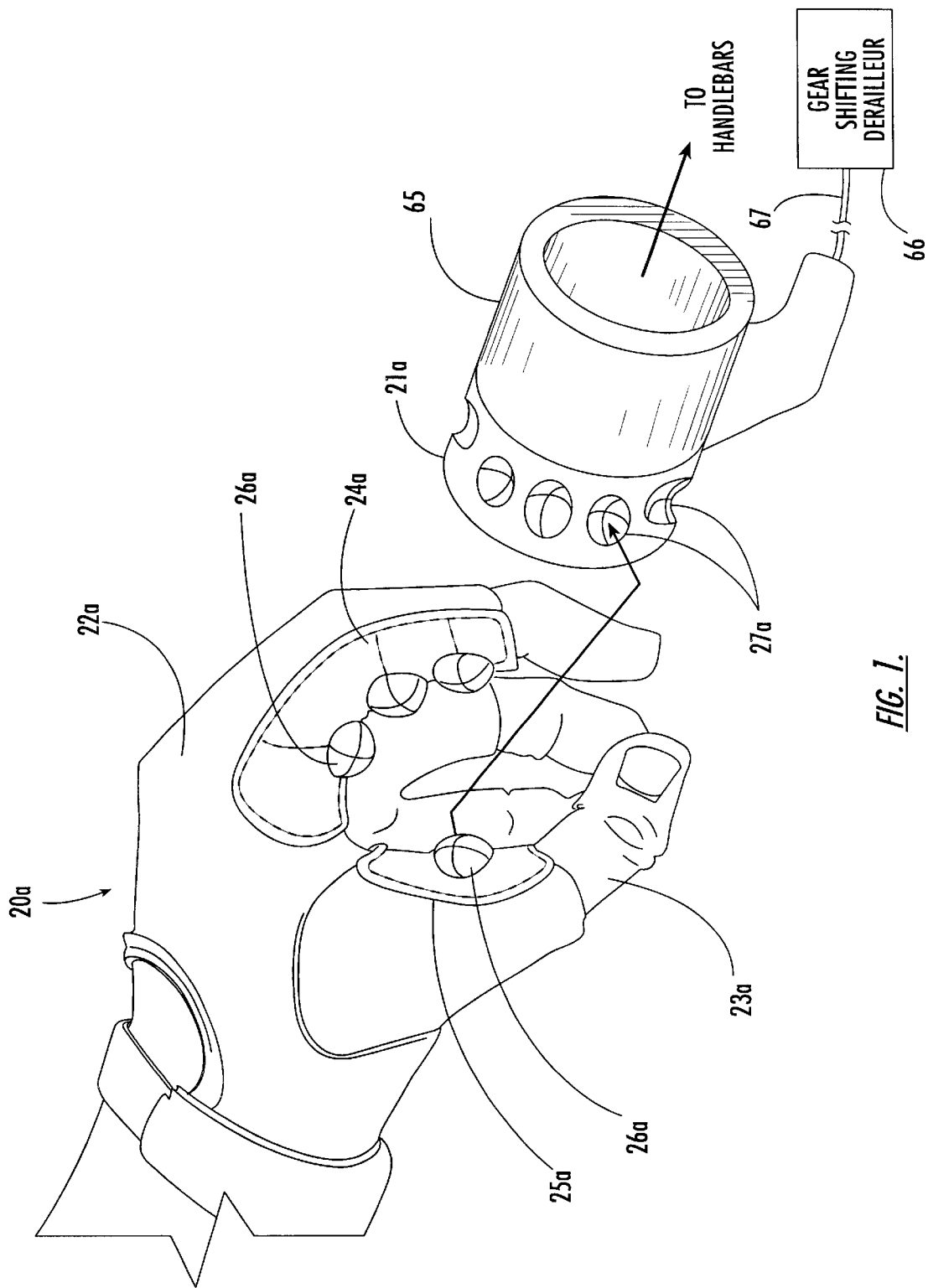
FIG. 1 is a perspective view of a bicycle gear shifting system including a twist derailleur actuator in accordance with the present invention.

Referring to FIG. 1, a first embodiment of a bicycle gear shifting system according to the present invention is now described. The gear shifting system includes a hand attachment or glove 20a, a tubular, rotatable shift member 21a rotatably carried by handlebars of the bicycle, and a twist derailleur actuator 65 also carried by the handlebars. The rotatable shift member 21a includes portions for operating the twist derailleur actuator 65 to actuate a gear shifting derailleur 66, as will be appreciated by those of skill in the art. The gear shifting derailleur 66 may be connected to the twist derailleur actuator 65 by a cable 67, for example.

The glove 20a includes a flexible body portion 22a to be worn on a hand 23a of a rider. The flexible body portion 22a may be formed of a fabric, for example, which is rugged, lightweight and which wicks moisture away from the hand of the user. Such materials will be readily appreciated by those skilled in the art. The flexible body portion 22a may cover all of the hand 23a, or only selected portions.

The glove 20a also includes a pair of gripping portions 24a, 25a carried by the flexible body portion 22a. The gripping portions 24a, 25a may include plastic, for example. One gripping portion 24a is attached to the forefinger portion of the flexible body portion 22a, while the second gripping portion 25a is attached to the thumb area of the flexible body portion.

As shown in the illustrated embodiment, a series of bumps or raised projections 26a are provided by the gripping portions 24a, 25a. These bumps 26a engage corresponding recesses 27a in the rotatable shift member 21a. Thus, the gripping portions 24a, 25a and rotatable shift member 21a define respective mating surfaces thereon for positively engaging one another to facilitate gear shifting by the rider. As will be appreciated by those skilled in the art, in view of the regularly spaced pattern of bumps 26a and corresponding recesses 27a, the hand 23a of the wearer can be in any of a number of rotational positions and still properly operate the shift actuator. In addition, since the bumps 26a can be formed to have some compliance or compressibility, perfect engagement with the corresponding recesses 27a is not necessary. The pattern of bumps 26a and recesses 27a can have other sizes and spacings, as will be appreciated by those skilled in the art.

Figures 2A, 2B:
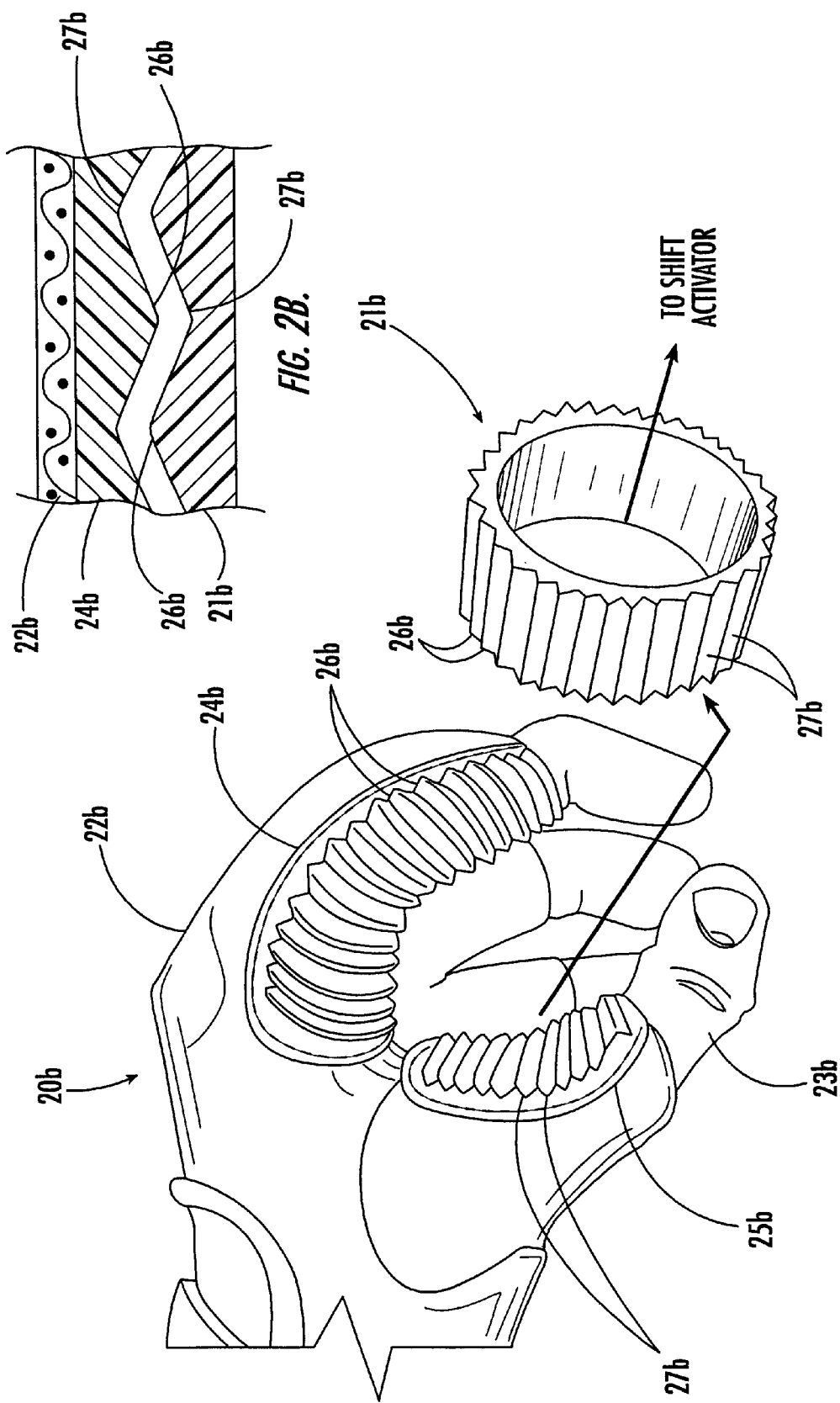
FIG. 2A is a perspective view of a second embodiment of a glove and portion of the shift actuator for a twist type shifter in accordance with the present invention.
FIG. 2B is a greatly enlarged cross-sectional view of a portion of the glove and shift actuator of FIG. 2A.

Turning now additionally to FIG. 2A, a second embodiment of the invention is now described. In this embodiment, a pair of gripping portions 24b, 25b are also stitched and/or glued, for example, to the forefinger and thumb areas of the body portion 22b of the glove 20b. However, in this embodiment, the gripping portions 24b, 25b are in the form of alternating ridges 26b and valleys 27b. These ridges 26b and valleys 27b mate or engage corresponding ridges and valleys of the rotatable shift member 21b as illustrated.

As will be readily appreciated by those skilled in the art, other patterns of mechanically engaging surface features may also be provided on the glove gripping portions 24b, 25b and the rotatable shift member 21b. The gripping portions 24b, 25b (or portion) may be rigid, semirigid or include portions of each. In addition, for the twist type shifter, the glove gripping portions 24b, 25b may also have one or more projections in the area of the thumb and forefinger which mate with or engage corresponding recesses on the rotatable shift member 21b. Of course, the engagement of the glove projections and mating shifter portions is desirably quickly releasable so that the rider may quickly and easily remove his hand 23b from the handlebar. To this end, the alternating ridges 26b and valleys 27b (or other types of projections and recesses) may be tapered, as may be more easily seen in the cross-sectional view of FIG. 2B. Of course, in other variations, the recesses and projections need not be tapered to provide the releasability feature, as the recesses could be slightly oversized. In yet other variations, the releasability feature may not be that important.

The present invention overcomes the difficulties of the twist grip bicycle gear shifters, since the rider need not release or weaken his grip to change gears. Rather, rotation of the hand 23b on the fixed handlebar is provided by the relative looseness of the skin even when a tight grip is maintained on the handlebar, as will be readily appreciated by those skilled in the art. In addition to the other advantages described, the present invention may lessen or prevent the formation of blisters on the rider's hand 23b and/or reduce hand cramping.

Figure 3:
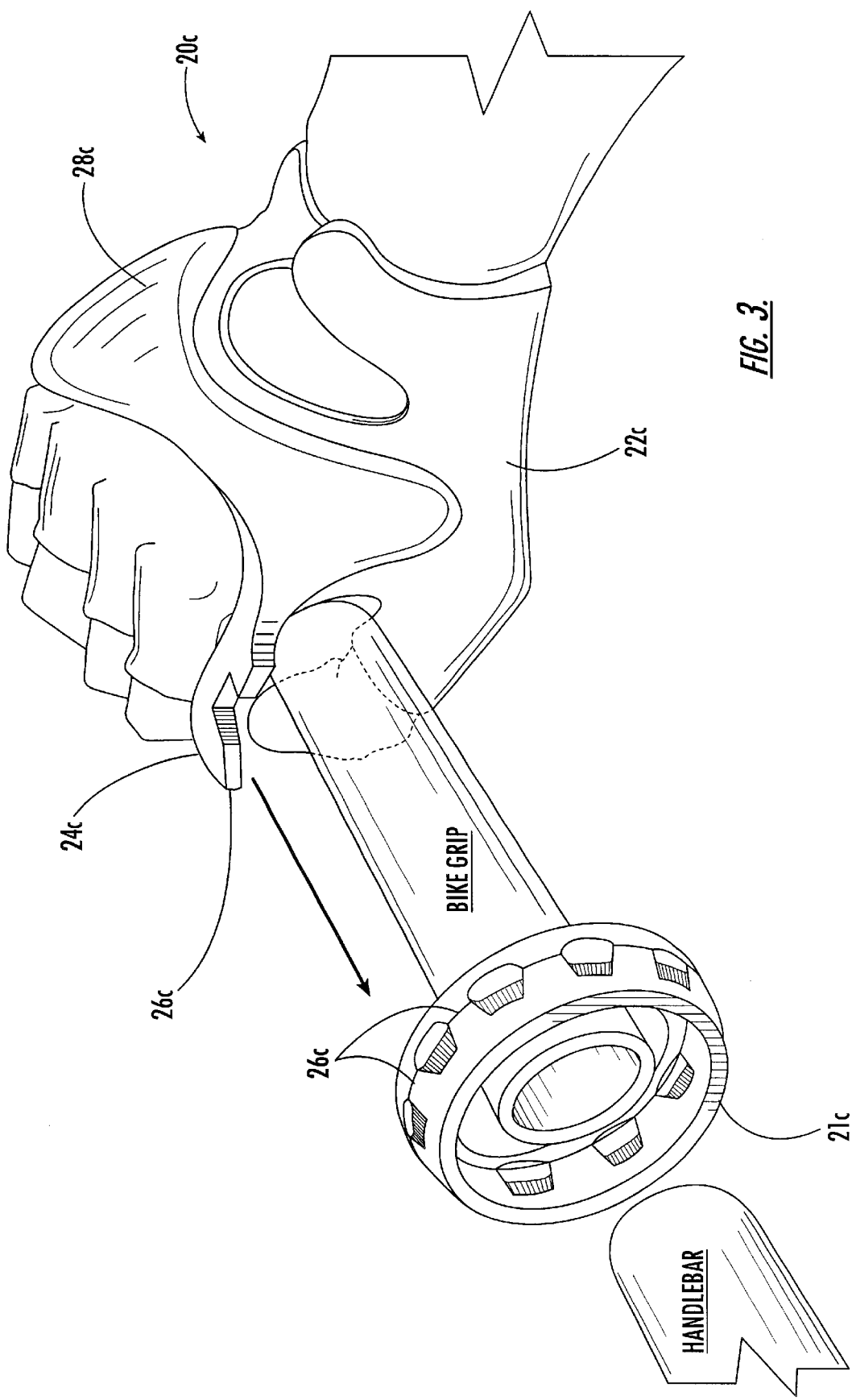
FIG. 3 is a perspective view of a third embodiment of a glove and portion of the shift actuator for a twist type shifter in accordance with the present invention.

Turning now additionally to FIG. 3, a third embodiment of the invention is described including a reinforcing portion or member 28c provided across the back of the hand or flexible body portion 22c and which is connected to the gripping portion 24c that mates with or engages a portion of the rotatable shift member 21c. That is, the respective mating surfaces of the gripping portion 24c and rotatable shift member 21c engage in side-by-side relation upon lateral positioning of the hand of the rider. In the illustrated embodiment, the gripping portion 24c defines a mating surface including teeth 26c which can engage corresponding teeth on the corresponding surface of the rotatable shift member 21c. Other shaped projections are also contemplated by the invention.

In the fourth embodiment of FIG. 4, a conical (i.e., tapered) spline gripping portion 24d is connected to the reinforcing member 28d. This conical spline arrangement cooperates with a mating arrangement on the rotatable shift member (not shown). This arrangement may be better appreciated by reference to the conical spline arrangement of FIG. 8.

A fifth embodiment of the hand attachment 20e is understood with reference to FIG. 5. In this embodiment, the hand attachment 20e includes a splined tubular sleeve member 24e with a figure-8 shaped hand engaging portion 28e connected thereto. The splines 26e on the tubular sleeve member 24e cooperate with corresponding splines on the rotatable shift member 21e.

Figure 6:
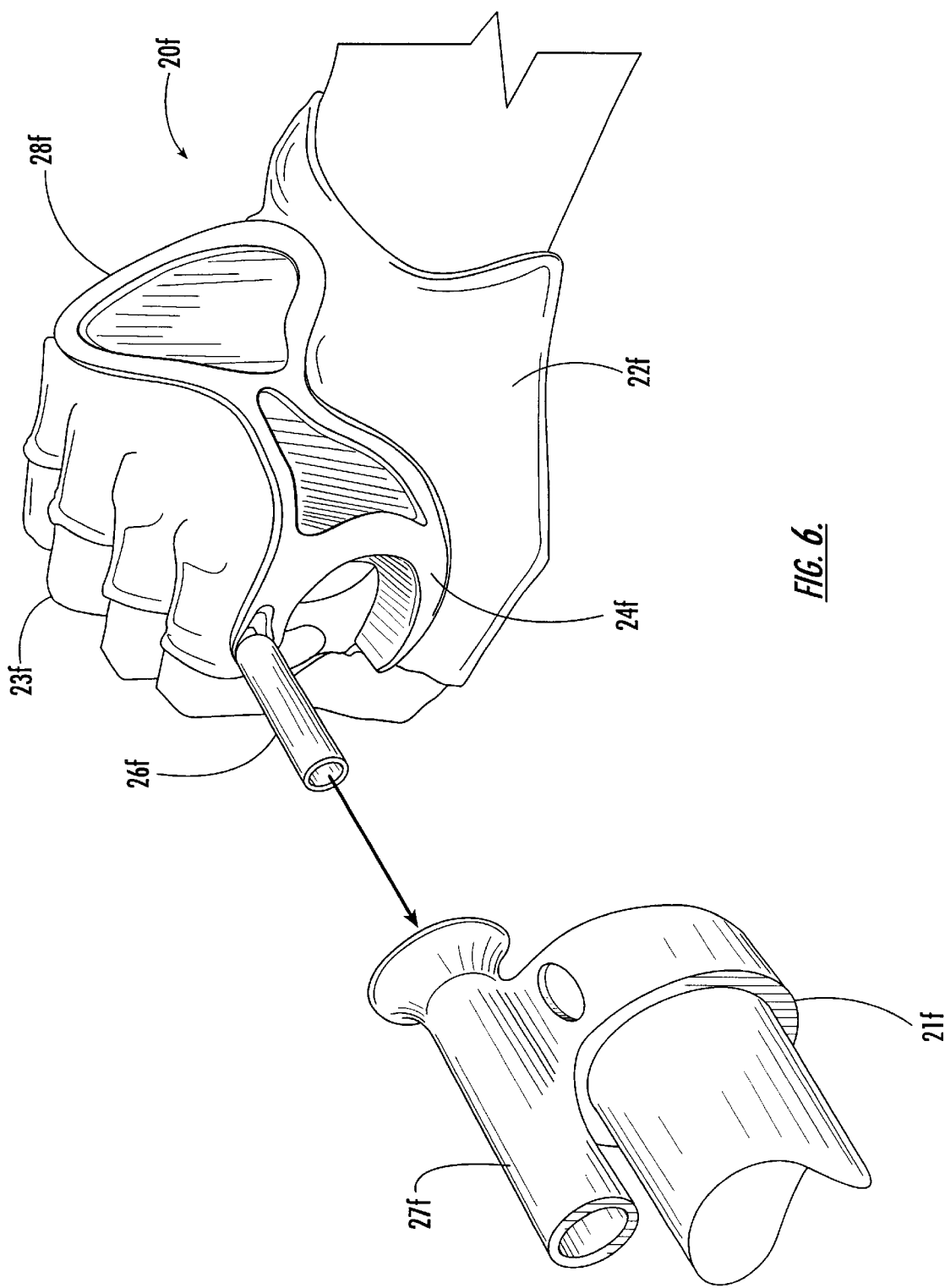
FIG. 6 is a perspective view of a sixth embodiment of a glove and portion of the shift actuator for a twist type shifter in accordance with the present invention.

The sixth embodiment illustrated in FIG. 6 includes a tubular extension 26f as the gripping portion. The tubular extension 26f is received in a corresponding slightly larger diameter tubular receiving member 27f carried by the rotatable shift actuator 21f.

Figure 7:
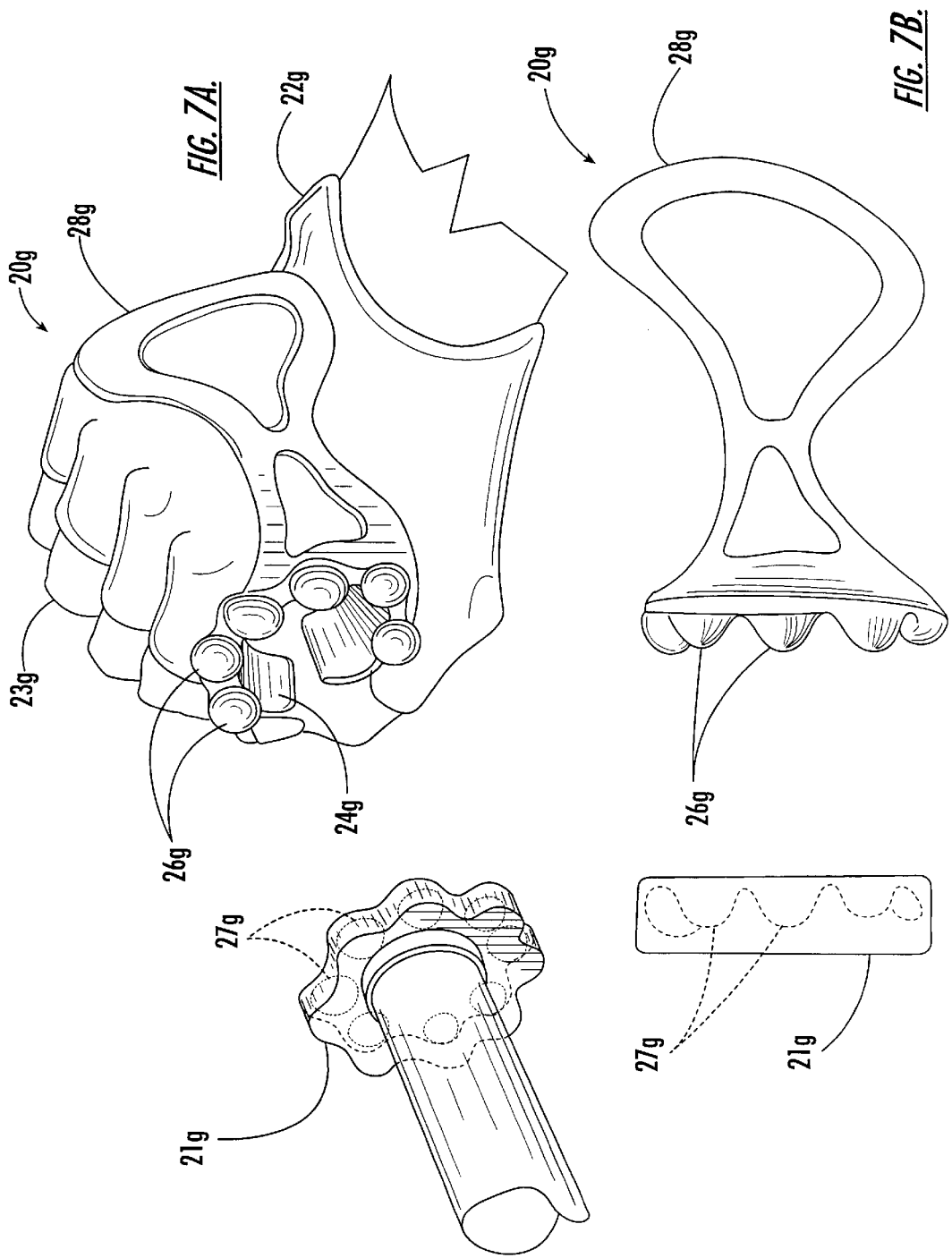
FIG. 7A is a perspective view of a seventh embodiment of a glove and portion of the shift actuator for a twist type shifter in accordance with the present invention.
FIG. 7B is a top plan view of the seventh embodiment shown in FIG. 7A.

The seventh embodiment shown in FIGS. 7A and 7B includes a pattern of balls or spheres 26g defined by the gripping portion which mate with corresponding recesses 27g in the rotatable shift member 21g. Again, in this embodiment, the gripping portion 24g is connected to the reinforcing member 28g which extends across the back of the hand 23g of the wearer, although in other embodiments the reinforcing member may not be needed.

Figure 8:
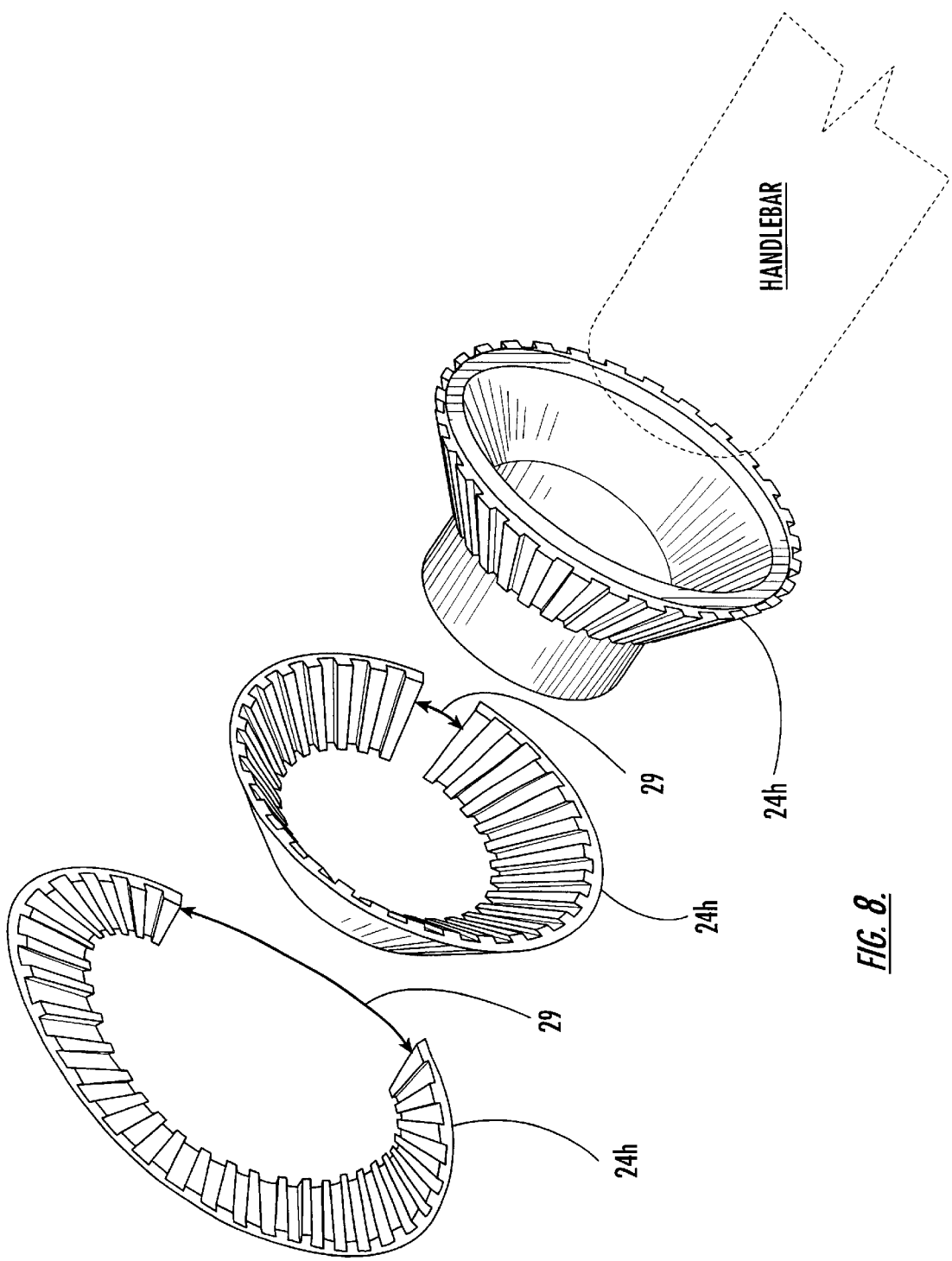
FIG. 8 is a perspective view of an eighth embodiment of a gripping portion of a hand attachment for a twist type shifter in accordance with the present invention.

An eighth embodiment shown in FIG. 8 includes a flexible conical (i.e., tapered) spline portion 24h which would span the thumb and forefinger portions of the body of the glove (not shown). The spline gripping portion 24h cooperates with the corresponding conical spline portion of the rotatable shift member (not shown). That is, the conical spline gripping portion 24h has a gap 29 therein so that respective mating surfaces of the conical spline gripping portion and the tubular shift member engage in superposed relation upon radial squeezing of the hand of the rider, as will be appreciated by those skilled in the art. Because it is tapered, the spline gripping portion 24h also facilitates quick release by the user.

Figure 9:
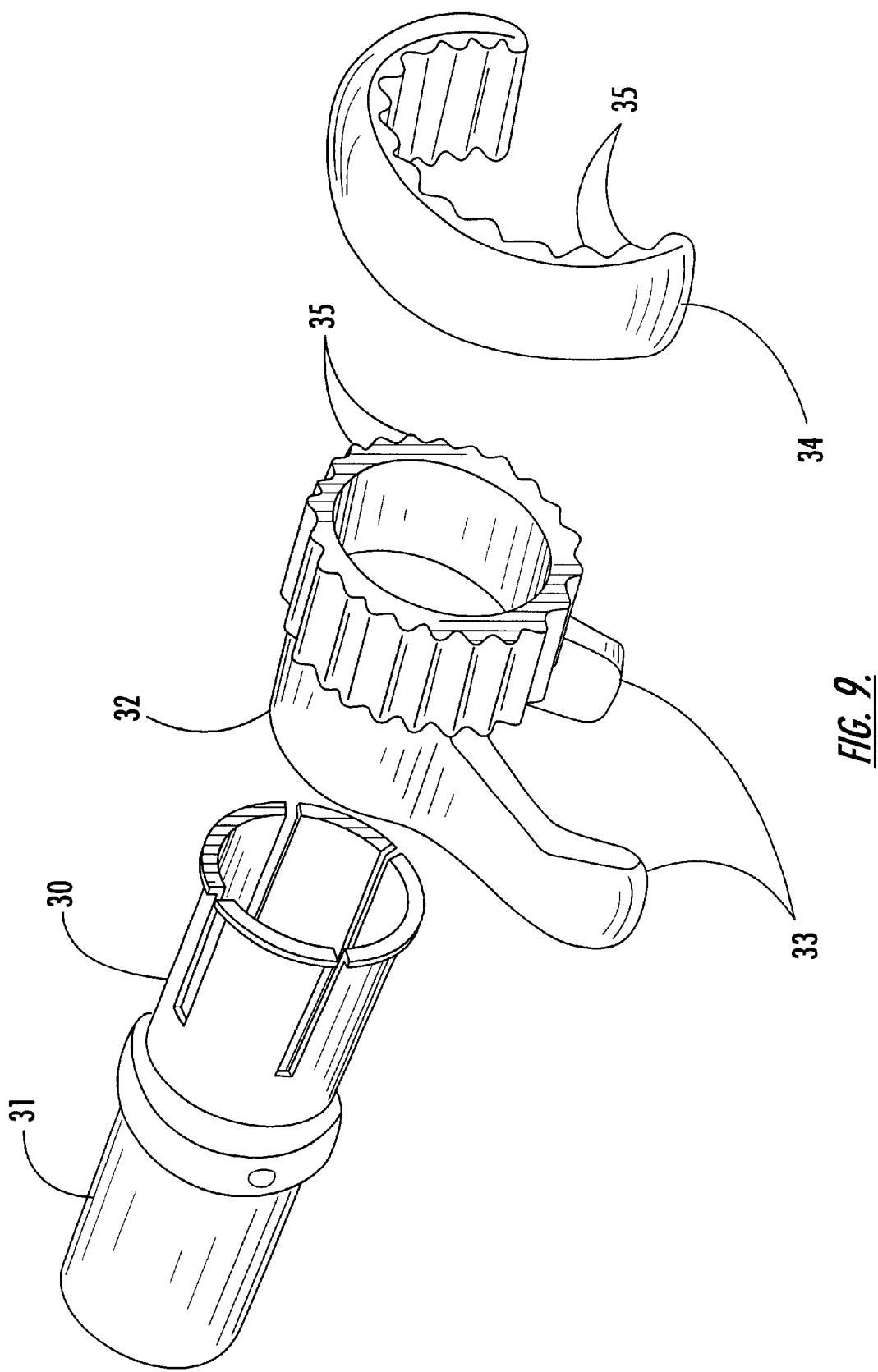
FIG. 9 is a perspective view of an ninth embodiment of a gripping portion of a hand attachment for a paddle type shifter in accordance with the present invention.

A ninth embodiment is shown in FIG. 9 and includes an anchor 30 that locks to the handlebar 31 and over which a rotatable portion 32 is fitted. The rotatable portion 32 includes a pair of paddle engaging portions or arms 33 extending radially outwardly for operating the shifter paddles of a paddle derailleur actuator. A ridged glove portion 34 engages corresponding ridges 35 on the rotatable portion 32.

Figure 10B:
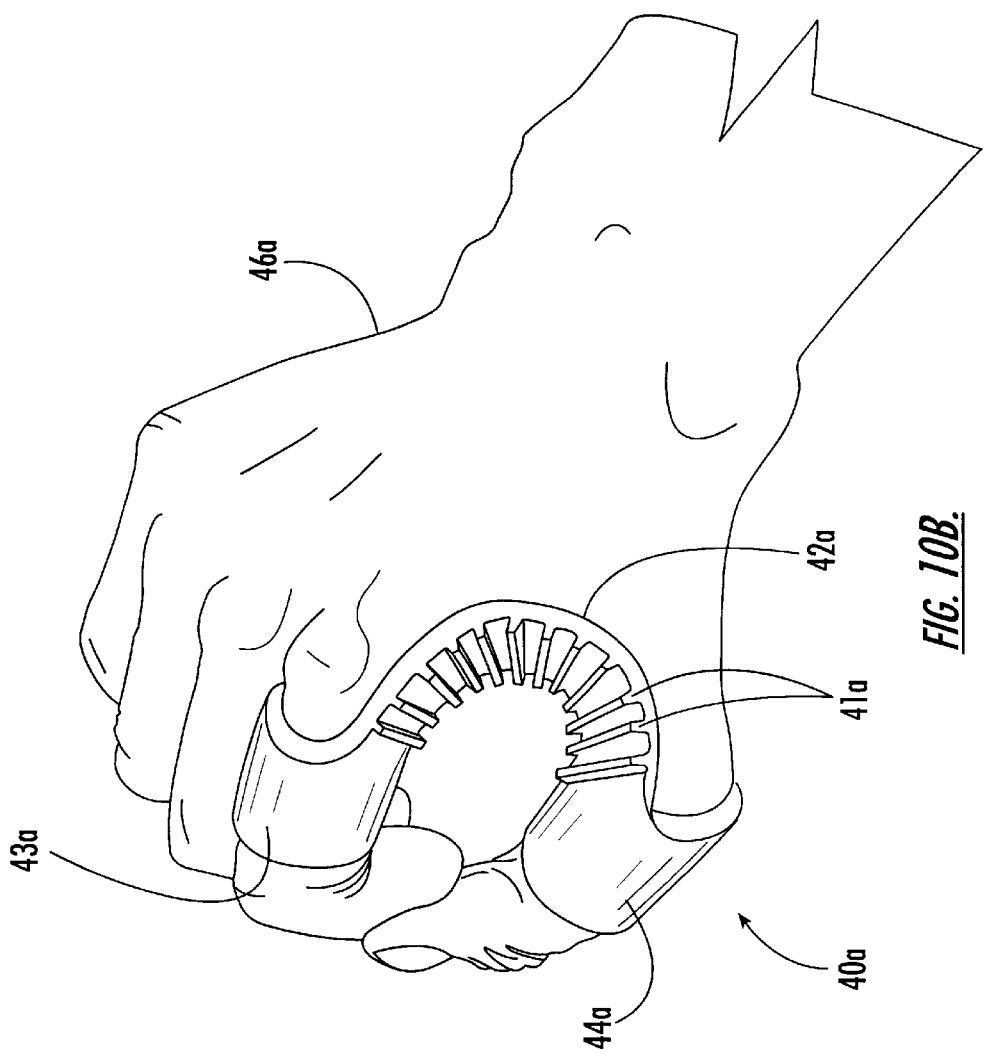
FIGS. 10A and 10B are perspective views of a tenth embodiment of a hand attachment for a twist type shifter in accordance with the present invention.
Figure 10A:
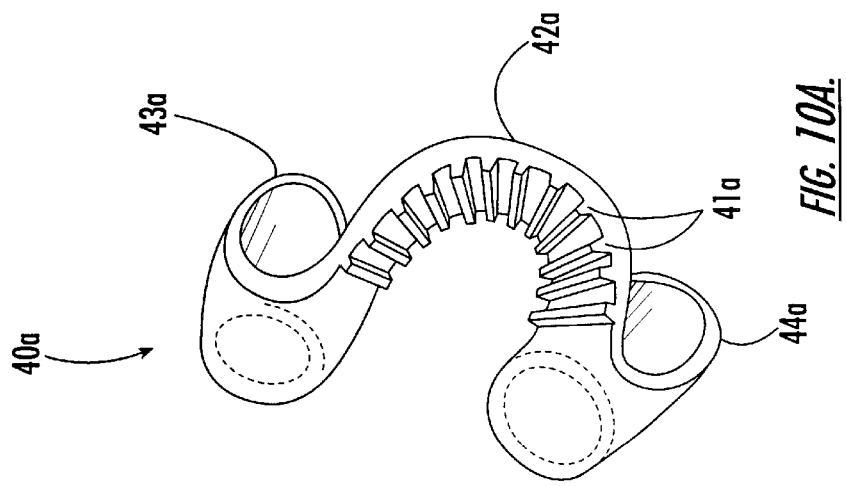

FIGS. 10A and 10B show a tenth embodiment of the invention in the form of a hand attachment 40a having a pattern of ridges 41a thereon. A band portion 42a extends between index finger and thumb tubular (or ring) portions 43a, 44a of a hand 46a. This hand attachment 40a can be used for embodiments wherein the actuators are twist shift type or paddle type, as will be appreciated by those skilled in the art.

The hand attachment 40b shown in FIGS. 11A and 11B is similar to the hand attachment 40a in that it includes a band portion 42b extending between an index finger tubular portion 43b and thumb tubular portion 44b. A pair of paddle engaging portions or arms 45a extend outwardly in spaced apart opposing relation from the thumb portion 44b of the hand attachment 40b. The arms 45a may include plastic, for example, and can engage and operate paddles of a paddle type shift derailleur actuator upon rotation of the hand attachment 42b.

FIGS. 12A and 12B show another embodiment wherein a tubular portion 50 is rotatably mounted on the handle bar 51 and carries a pair of outwardly extending arms 52. Again, the arms 52 are configured and arranged to engage and operate the paddles 53a of the paddle type shifter 54a. This embodiment may also be considered as converting a paddle-type shifter into a twist-type shifter as will be appreciated by those skilled in the art, as a twisting motion is used to operate the paddles. For example, a body portion of the tubular portion may be extended so as to be able to be grasped by the rider and rotated to cause shifting. Accordingly, the thumb or forefinger which would otherwise be used to engage the paddles can remain firmly grasped on the extended portion. A hand attachment including a gripping portion may be optionally used in these embodiments as well.

Figure 13:
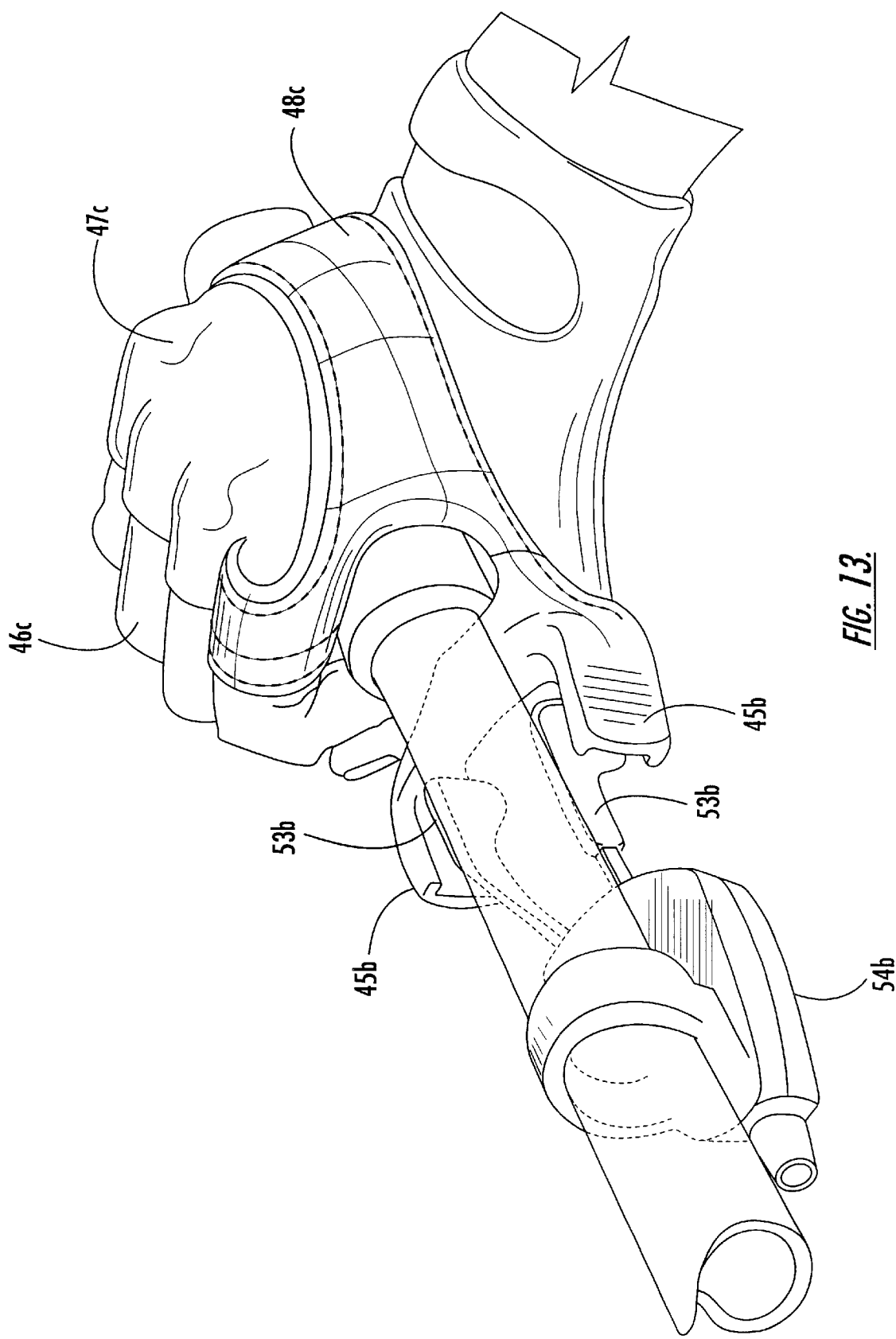
FIG. 13 is a perspective view of a thirteenth embodiment of a glove and portion of a paddle type shift actuator in accordance with the present invention.

A variation of the embodiment shown in FIG. 11 is shown in FIG. 13. In this thirteenth embodiment, a fabric glove 47c is connected to a more rigid body portion 48c which defines the pair of spaced apart opposing arms 45b to engage the paddles 53b of the paddle derailleur actuator 54b.

Figure 14:
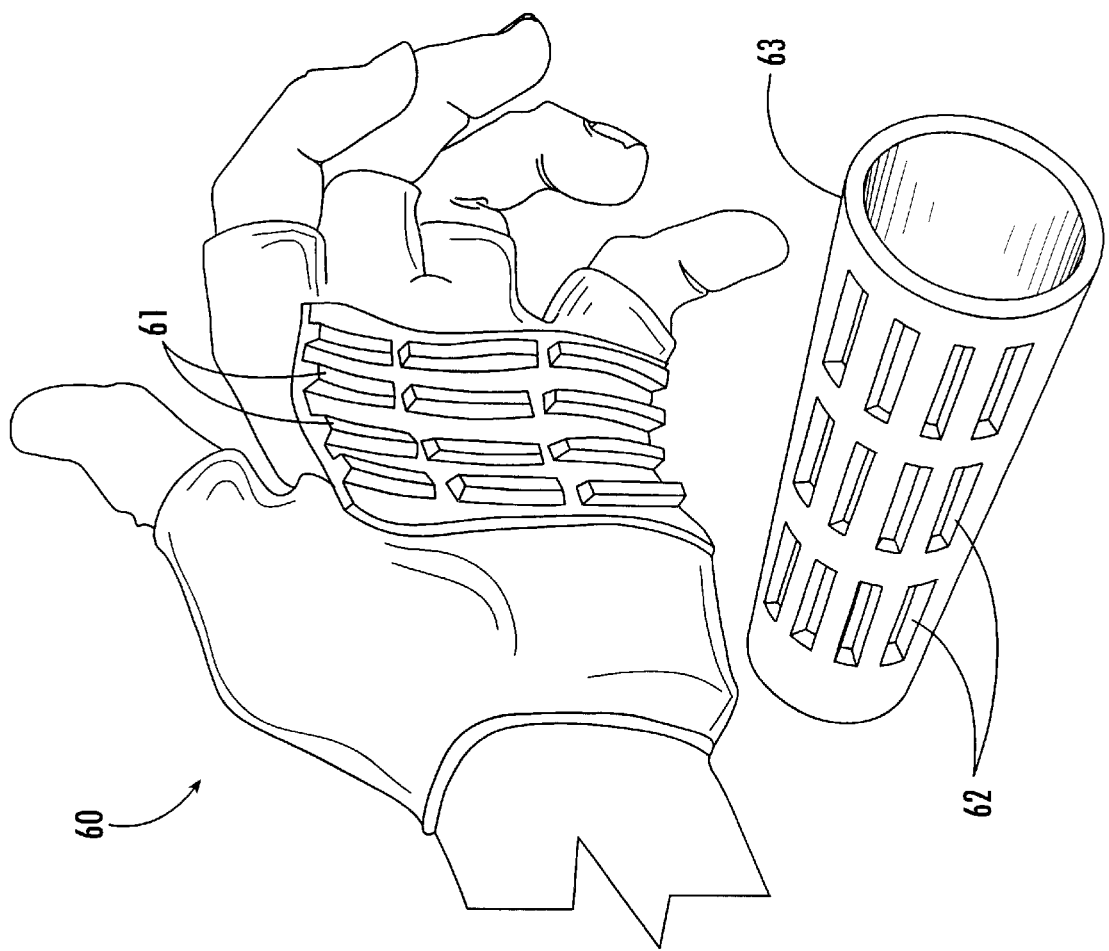
FIG. 14 is a perspective view of a fourteenth embodiment of a glove and portion of the shift actuator for a twist type shifter in accordance with the present invention.

FIG. 14 illustrates another embodiment of the invention wherein the glove 60 includes a pattern of ridges 61 thereon. The pattern includes four rows and three columns in the illustrated embodiment, although other patterns are also contemplated by the invention. A corresponding pattern of recesses or valleys 62 is formed on the rotatable tubular portion 63. Of course, the pattern of recesses and ridges could be reversed, or a combination of ridges and recesses provided on each surface. The tubular portion 63 could be used for either paddle type or twist type shifters. The fourteenth embodiment may also be varied wherein the outer three fingers of the rider's hand engage a correspondingly shaped tubular portion that is fixed to the handlebar for additional stability.

Figure 15:
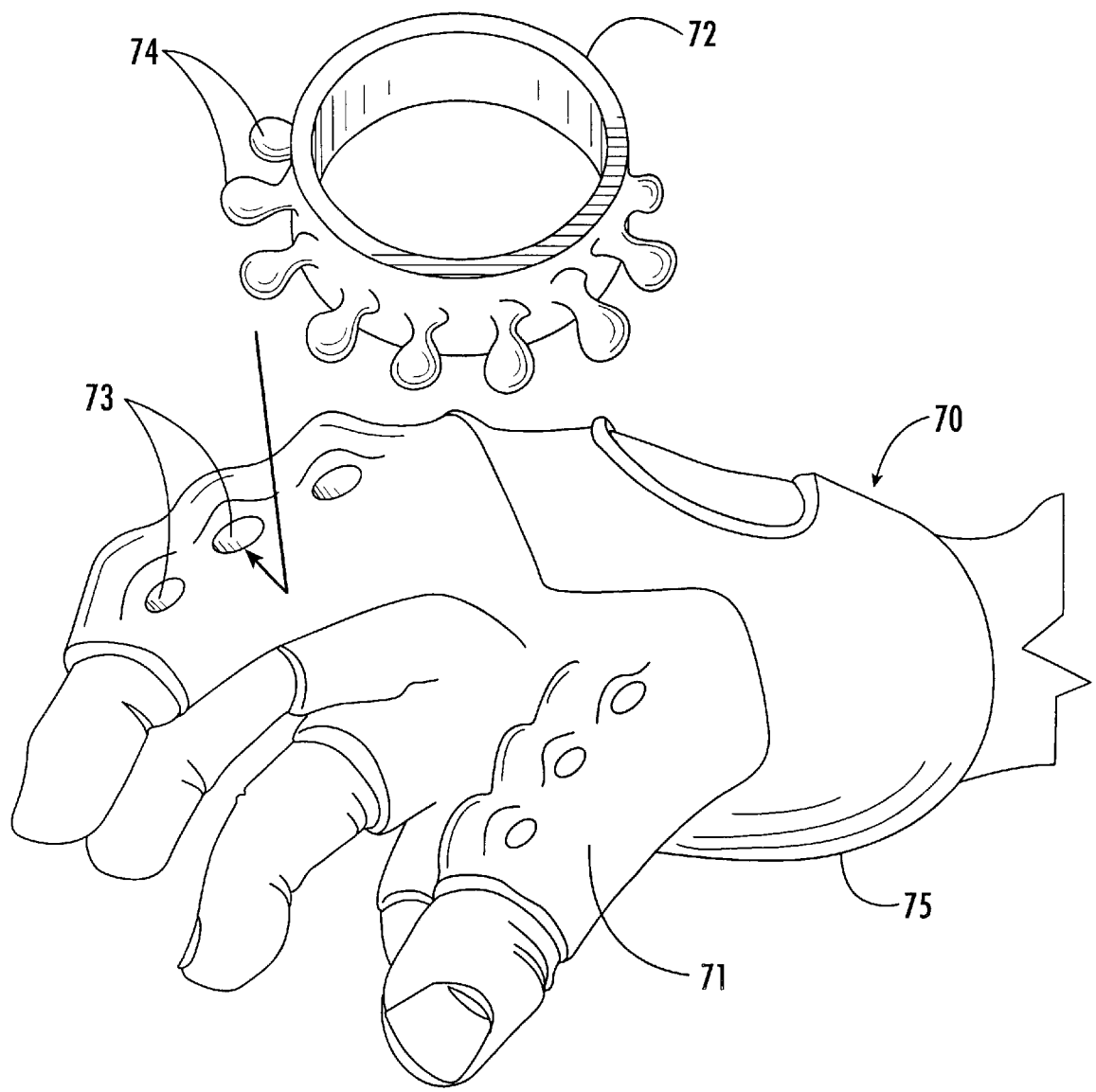
FIG. 15 is a perspective view of a fifteenth embodiment of a glove and portion of a shift actuator in accordance with the present invention.

Referring now to FIG. 15 another embodiment is shown wherein the glove 70 includes a gripping portion 71 which in turn includes recesses in the form of openings 73 therethrough. The openings 73 mate with the corresponding projections 74 on the rotatable tubular portion 72. The illustrated glove 70 also includes a fabric portion 75 to carry the gripping portion 71.

Turning now to FIGS. 16A and 16B another embodiment of a shifting system 80 is described. In this embodiment, a clutch type arrangement is provided wherein the flexibility of the skin of the rider's hand may also be used to advantage. A first clutch plate 81 is carried by the handlebar and may be the twist grip or connected to the twist grip, for example. The second clutch plate 82 may engage the first clutch plate 81 by the inward movement of the rider's hand, while the hand retains an otherwise tight grip. A spring 83 may be provided in some embodiments to bias the clutch plates 81, 82 apart from one another. The second clutch plate 82 may be rotatably carried by the handlebars or may be formed into the gripping portion of a glove for the rider along the lines as described extensively above. This clutch embodiment is similar to the other embodiments described above, such as with reference to FIGS. 3–5, wherein the user's hand is urged inwardly for engagement and shifting. In yet other embodiments, the second clutch plate 82 may be carried by a rotatable or tubular body to be grasped by the user.

In the various embodiments gripping surfaces have been shown and described, however, in other embodiments these gripping surfaces may be supplemented by or replaced by VELCRO type cooperating loop and hook fastener surfaces, as will be appreciated by those skilled in the art. Furthermore, in the above referenced drawings only a single hand attachment and cooperating gear shift actuator is shown for each embodiment for ease of illustration. Of course, more than one hand attachment and cooperating gear shift actuator according to the invention may be used on a bicycle (e.g., one for each derailleur on the bicycle).

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that other modifications and embodiments are intended to be included within the scope of the appended claims.

That which is claimed is:

1. A bicycle gear shifting system comprising:

a gear shifting derailleur;

a rotatable shift member to be rotatably carried by handlebars of the bicycle and connected to said gear shifting derailleur; and a hand attachment to be carried by a hand of a rider;

said rotatable shift member and said hand attachment each having respective mating surfaces for positively engaging one another to facilitate gear shifting by the rider;

said mating surfaces comprising pairs of corresponding recesses and projections.

2. The bicycle gear shifting system according to claim 1 wherein said pairs of corresponding recesses and projections are tapered to facilitate ready release.

3. The bicycle gear shifting system according to claim 1 wherein said mating surfaces engage in superposed relation upon radial squeezing of the hand of the rider.

4. The bicycle gear shifting system according to claim 1 wherein said mating surfaces engage in side-by-side relation upon lateral positioning of the hand of the rider.

5. The bicycle gear shifting system according to claim 1 wherein said hand attachment comprises a gripping portion defining the mating surface thereof.

6. The bicycle gear shifting system according to claim 5 wherein said hand attachment further comprises a flexible body portion for covering at least a portion of the hand of the rider and carrying said gripping portion.

7. The bicycle gear shifting system according to claim 6 further comprising a reinforcing portion connected to said gripping portion and also carried by said flexible body portion.

8. The bicycle gear shifting system according to claim 6 wherein said flexible body portion comprises fabric.

9. The bicycle gear shifting system according to claim 5 wherein said gripping portion comprises plastic.

10. The bicycle gear shifting system according to claim 5 wherein said hand attachment further comprises at least one finger ring portion connected to said gripping portion.

11. The bicycle gear shifting system according to claim 10 wherein said at least one finger ring portion comprises a thumb ring portion and an index finger ring portion; and wherein said gripping portion extends between said thumb ring portion and said index finger ring portion.

12. The bicycle gear shifting system according to claim 1 further comprising a twist derailleur actuator carried by the handlebars; and wherein said rotatable shift member comprises portions for operating said twist derailleur actuator.

13. The bicycle gear shifting system according to claim 1 further comprising a paddle derailleur actuator carried by the handlebars; and wherein said rotatable shift member comprises a pair of paddle engaging portions for operating said paddle derailleur actuator.

* * * * *